Figure 1:
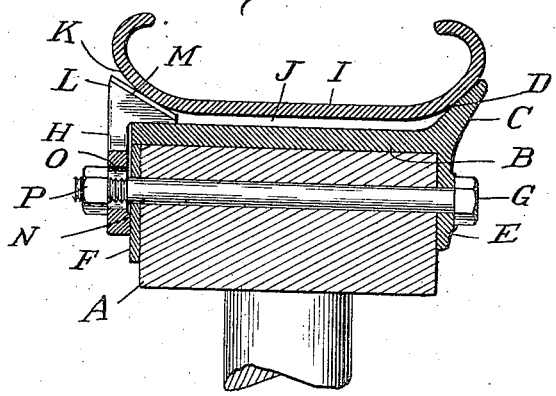
Figure 2:
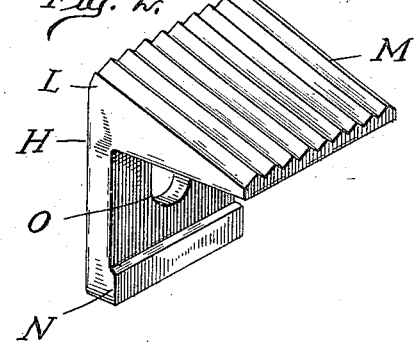
Figure 3:
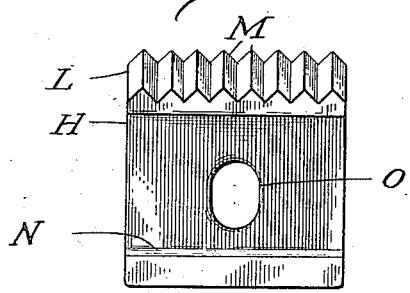

R. C. KLEFFMAN.
RIM LUG FOR VEHICLE WHEELS.
APPLICATION FILED APR. 16, 1918.

1,416,648.

Patented May 16, 1922.

Inventor
Ray Charles Kleffman
Attorney.

UNITED STATES PATENT OFFICE.

RAY CHARLES KLEFFMAN, OF HIBBING, MINNESOTA.

RIM LUG FOR VEHICLE WHEELS.

1,416,648.     Specification of Letters Patent.     Patented May 16, 1922.

Application filed April 16, 1918. Serial No. 228,958.

*To all whom it may concern:*

Be it known that I, RAY CHARLES KLEFFMAN, citizen of the United States, residing at Hibbing, in the county of St. Louis and State of Minnesota, have invented certain new and useful Improvements in Rim Lugs for Vehicle Wheels; and I do hereby declare the following to be a full, clear, and exact description of the invention, such as will enable others skilled in the art to which it appertains to make and use the same.

This invention relates to improvements in vehicle wheels, and more particularly to that class of wheels generally used on automobiles equipped with so-called demountable rims having pneumatic tires secured therein.

The invention relates more particularly to what is known as a rim-lug for firmly securing the demountable rim upon the felly of the wheel, and has for its particular object to provide a device of this character which is rigidly secured to one of said parts, preferably the felly of the wheel, and engages the demountable rim for holding the latter against lateral movement with respect to the felly, and at the same time to hold the same against rotation or so-called creeping with relation to said felly for preventing the shearing or tearing off of the valve-housing or valve tube of the pneumatic tire mounted in the rim, and which projects through openings in the rim and felly, it being the main object of the present invention to provide simple and efficient means to maintain said openings in register.

A further essential object of the invention is to provide a rim-lug which is adapted to be used upon any of the standard types of wheels equipped with demountable rims to perform the aforesaid functions.

In the accompanying drawings illustrating a rim-lug constructed in accordance with the invention:

Figure —1— is a fragmentary detail radial section through the felly of a wheel and a demountable rim thereon equipped with a rim lug constructed in accordance with my invention; the rim-lug being shown in side elevation partially in section.

Figure —2— is a detail perspective view of the rim-lug.

Figure —3— is an end elevation of the same.

The felly A of a wheel, which may be of wood or metal, and of any one of numerous types of construction, is provided with a metallic band B which is provided along one side edge with an annular flange C disposed angularly relatively to the body of the band B and presents an inner inclined face D. The said flange C is preferably integral with the band B and an annular side flange E thereof extending inwardly and engaging one side face of the felly A. The flange E may, however, consist of a separate element similar to the flat ring F disposed on the opposite side face of the rim A and secured thereto by means of a plurality of bolts G (one of which is shown in Figure —1—) which serves to secure the band B and its flange E to the felly A, and also to secure the ring F and the rim lugs H to the opposite side face thereof, it being preferable, however, that the said ring F or opposed flange E be secured independently of the bolts G, as for example, by means of rivets or other suitable fastening devices.

The demountable rim I is preferably of somewhat greater inner or minimum diameter than the outer face of the body portion of the band B so as to leave a free annular space J between said parts which renders demounting and remounting of the rim I easy of accomplishment. The side edge portions of the rim I present double convex surfaces K, one of which engages and finds support upon the inclined surface D of the flange C, and the other of which is supported upon the flange L of the rim-lug H. Said flange L constitutes a wedge one face of which extends substantially perpendicularly to the body portion thereof opposing the ring F or side face of the felly A, and the other face of which is inclined, the free edge of said flange L being very much thinner than the portion thereof effecting junction with the body of the lug. This inclined surface of the flange L upon which the tubular convex surface K at one side of the rim I is supported, is provided with a plurality of sharp ribs M which are adapted to bite into the opposed surface K of the rim I so as to prevent creeping of said rim about the felly A during travel of the vehicle. The inclination of what might be termed the serrated or corrugated face of the flange L is such as to crowd the rim I toward the flange C, thus holding it firmly against lateral movement relatively to the felly and wheel body as well as preventing creeping thereof.

On the inner face of the body of the rim lug H and at the lower edge thereof there is provided a very short flange or projection N which serves normally to prevent the main portion of the inner face of the body of said rim-lug from coming into contact with the opposed side face of the felly A or parts mounted thereon. In said body portion and above said flange M is a slot O through which the threaded end of the bolt G is adapted to pass, the nut P mounted on said threaded end being adapted to bear upon the outer face of the body of the rim-lug for forcing the latter into the position shown in Figure —1—.

Obviously the corrugated surface of the flange L of the rim-lug must be harder than the metal of the rim I in order to effect biting into the latter for the purpose of preventing creeping of said rim. This may be effected by case-hardening, or by making the rim lugs of chilled iron or steel, or of a higher carbon steel than is usually used in the manufacture of the rims I.

The creeping of the rim about the felly of the wheel causes the valve stems or housings of the pneumatic tires mounted in such demountable rims, and which extend through registering openings in the rim I and the felly A to be sheared off, thereby obviously causing deflation of the tire and also necessitating a comparatively expensive repair. My said rim-lug entirely obviates this creeping while performing all of the other functions usually performed by the rim-lugs at present in use.

The surface of the rim-lug opposed to and engaging the demountable rim may be constructed in any other manner than that shown for performing the same function, namely: biting into the opposed surface of said demountable rim to prevent creeping of the latter about the felly and any well-known means for performing this function may obviously be substituted for the serrated or corrugated face shown in the accompanying drawings without departing from the invention as defined in the appended claims.

The opposed faces of the rim I and tire or band B are, in all standard makes of wheels of this character, perfectly smooth. My said rim-lug does not injure or appreciably roughen the surface engaged by the sharp edges of the teeth or corrugations of the rim lug, and will not require that the rim be accurately replaced in the same position, after demounting and upon remounting as previous thereto in order to secure the desired engagement for preventing creeping for the reason that the sharp edges of the corrugations or teeth will bite into the metal at very closely contiguous points after each removal of the rim and replacement thereof within the limits permitted by relatively offsetting the valve-tube openings in the rim and felly.

I claim as my invention:

1. In a wheel equipped with a demountable rim, the combination with means on the wheel for engaging a side portion of the rim for preventing relative movement of said parts axially of the wheel in one direction, of means for simultaneously preventing such movement in the opposite direction and relative rotation of said parts, comprising lugs adapted to be secured to the wheel felloe and each equipped with a wedge tongue adapted to pass between the wheel felloe and the opposed surface of the rim, said tongues having surface formations adapted to bite into the opposed surface of the rim.

2. In a wheel equipped with a demountable rim having a smooth surface opposing the wheel felloe, means for preventing creeping of said rim around said wheel including lugs removably secured to the wheel and equipped with wedge tongues disposed between the felloe and rim, and having surface formations adapted to bite into the rim as the said tongues are forced into the space between the latter and the felloe.

3. The combination with a wheel felloe and a demountable rim therefor presenting opposed smooth surfaces, of means for preventing relative rotation of said parts comprising wedge-elements removably secured to one of said parts and engaging between the same provided with surface formations adapted to bite into the surface of the other part to provide substantial interlock opposed to said relative rotation.

4. A rim lug for automobiles having a wedging part formed with means for cutting a seat for said lug.

5. A rim lug for automobiles having a wedge part formed with cutting edges disposed longitudinally of the wedge part.

6. The combination with a wheel and its rim, of means for preventing creeping movement of the rim relative to the wheel circumferentially thereof, said means including a wedge part formed to be held against movement relative to one of the wheel and rim members, said wedge part also having means operable in the applying movement of the wedge to positively change the original structural formation of the other of said members to create a substantial interlock between the same and wedge opposed to said creeping movement.

RAY CHARLES KLEFFMAN.